UNITED STATES PATENT OFFICE.

ARTHUR LINZ, OF NEW YORK, N. Y., ASSIGNOR TO THE CHEMICAL FOUNDATION INCORPORATED.

PROCESS OF PRODUCING TUNGSTEN LAKES.

1,378,882.  Specification of Letters Patent.  Patented May 24, 1921.

No Drawing.   Application filed January 19, 1921. Serial No. 438,449.

*To all whom it may concern:*

Be it known that I, ARTHUR LINZ, a citizen of the United States, residing in New York city, county of New York, borough of Manhattan, and State of New York, have invented certain new and useful Improvements in Processes of Producing Tungsten Lakes, of which the following is a full, clear, and exact specification.

My invention relates to the production of color lakes and refers particularly to the production of lakes containing tungsten.

It is known that certain coal-tar dyes can be converted into lakes containing tungsten and that the thus produced products have valuable properties and are capable of wide commercial application, if producible, at a cost which will allow their economic adoption.

The former known processes of producing these products are not of such a character as to allow their general adoption, as they are expensive due to the involved chemicals employed therein, which can be produced only by the expenditure of considerable time and labor.

These color-lakes have been previously produced by means of a complex acid containing tungsten, for instance, phosphotungstic acid and silicotungstic acid and, as an example of the former, it has been suggested that phospho-duodedi-tungstic acid and phospho-luteo-tungstic acid be employed.

The preparation of these acids and their separation from the resultant by-products is involved, difficult and expensive, and hence, their use has materially affected the production of the tungsten lakes and has prevented their general adoption.

I have discovered a method of producing tungsten lakes without the production and isolation of the above-mentioned acids, thus saving all of the expense incident thereto and my process presents a means whereby these tungsten lakes may be produced at a cost that will allow of their general use and thus place these valuable products within the field of large commercial adoption.

The process of my invention comprises intermixing a solution of a precipitable dyestuff, a solution of a soluble compound of phosphorus, a solution of a soluble compound of tungsten and a solution of an acid in such quantities as to cause the precipitation of the tungsten lake.

Among the dyestuffs suitable for the carrying out of my process are the basic coal-tar dyes, but I do not limit myself to this particular group of coloring matters.

A large number of the soluble compounds of tungsten can be employed, as sodium tungstate, tungstic acid and similar compounds and among the soluble phosphorus compounds suitable for use are di-sodium phosphate, phosphoric acid and similar compounds.

I can employ either suitable organic, or inorganic, acids, and these acids may be entirely dispensed with, if the color precipitation takes place without their use.

The following is an example of the following out of my process:—

To 4½ pounds of crystal violet (a salt of hexamethyltriamino-triphenylcarbinol) dissolved in 100 pounds of water there is added a solution of 8 pounds sodium tungstate and a solution of 1 pound of di-sodium phosphate. 5 pounds of acetic acid 56% is then added. The tungsten lake is thus formed and the mixture may be boiled, if necessary, to produce complete precipitation.

The above described example produces a tungsten lake of crystal violet, but it can be carried out in the presence of any substratum to precipitate the lake thereon.

It is evident from the above that my process presents a means whereby these valuable lakes may be produced in an easy, economical and effective manner and thus possesses the valuable property of allowing the production of these products for largely increased consumption.

I do not limit myself to the particular chemicals, quantities, temperatures or steps of procedure, as described, all of which may be varied without going beyond the scope of my invention as described and claimed.

What I claim is:—

1. The process of producing a color-lake which comprises precipitating a coloring matter by means of a soluble compound of tungsten and a soluble compound of phosphorus.

2. The process of producing a color-lake which comprises precipitating a coloring matter by means of a soluble compound of tungsten, a soluble compound of phosphorus and a suitable acid which will form a double salt of tungsten in the presence of a coloring matter without destroying the latter.

3. The process of producing a color-lake which comprises precipitating a basic dyestuff by means of a soluble compound of tungsten and a soluble compound of phosphorus.

4. The process of producing a color-lake which comprises precipitating a basic dyestuff by means of a soluble compound of tungsten, a soluble compound of phosphorus and a suitable acid which will form a double salt of tungsten in the presence of a coloring matter without destroying the latter.

5. The process of producing a color-lake which comprises precipitating a coloring matter from a solution thereof by adding thereto a solution of a compound of tungsten and a solution of a compound of phosphorus.

6. The process of producing a color-lake which comprises precipitating a coloring matter from a solution thereof by adding thereto a solution of a compound of tungsten, a solution of a compound of phosphorus and a suitable acid which will form a double salt of tungsten in the presence of a coloring matter without destroying the latter.

7. The process of producing a color-lake which comprises precipitating a basic dyestuff from a solution thereof by adding thereto a solution of a compound of tungsten and a solution of a compound of phosphorus.

8. The process of producing a color-lake which comprises precipitating a basic dyestuff from a solution thereof by adding thereto a solution of a compound of tungsten, a solution of a compound of phosphorus and a suitable acid which will form a double salt of tungsten in the presence of a coloring matter without destroying the latter.

9. The process of producing a color-lake which comprises precipitating a coloring matter from a solution thereof by adding thereto a solution of sodium tungstate, a solution of a compound of phosphorus and a suitable acid which will form a double salt of tungsten in the presence of a coloring matter without destroying the latter.

10. The process of producing a color-lake which comprises precipitating a coloring matter from a solution thereof by adding thereto a solution of a compound of tungsten, a solution of di-sodium phosphate and a suitable acid which will form a double salt of tungsten in the presence of a coloring matter without destroying the latter.

11. The process of producing a color-lake which comprises precipitating a coloring matter from a solution thereof by adding thereto a solution of sodium tungstate, a solution of di-sodium phosphate and a suitable acid which will form a double salt of tungsten in the presence of a coloring matter without destroying the latter.

12. The process of producing a color-lake which comprises precipitating a basic dyestuff from a solution thereof by adding thereto a solution of sodium tungstate, a solution of di-sodium phosphate and a suitable acid which will form a double salt of tungsten in the presence of a coloring matter without destroying the latter.

13. The process of producing a color-lake which comprises precipitating crystal violet from a solution thereof by adding thereto a solution of sodium tungstate, a solution of di-sodium phosphate and acetic acid.

Signed at 233 Broadway in the county of New York and State of New York this 18 day of January, 1921.

ARTHUR LINZ.